United States Patent
Jeannin et al.

(10) Patent No.: US 7,333,712 B2
(45) Date of Patent: Feb. 19, 2008

(54) VISUAL SUMMARY FOR SCANNING FORWARDS AND BACKWARDS IN VIDEO CONTENT

(75) Inventors: Sylvie Jeannin, New York, NY (US); John Zimmerman, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1192 days.

(21) Appl. No.: 10/076,183

(22) Filed: Feb. 14, 2002

(65) Prior Publication Data

US 2003/0152363 A1    Aug. 14, 2003

(51) Int. Cl.
*H04N 5/76* (2006.01)
*H04N 7/00* (2006.01)

(52) U.S. Cl. .............................. 386/68; 386/95; 386/69

(58) Field of Classification Search .................. 386/68, 386/69, 70, 7, 6, 8; 348/700, 701, 702
See application file for complete search history.

(56) References Cited

U.S. PATENT DOCUMENTS

| | | | | |
|---|---|---|---|---|
| 6,100,941 | A * | 8/2000 | Dimitrova et al. | 348/700 |
| 6,137,544 | A | 10/2000 | Dimitrova et al. | 348/700 |
| 6,236,395 | B1 * | 5/2001 | Sezan et al. | 715/723 |
| 6,335,742 | B1 * | 1/2002 | Takemoto | 715/781 |
| 6,728,473 | B1 * | 4/2004 | Chotoku et al. | 386/95 |

FOREIGN PATENT DOCUMENTS

| | | |
|---|---|---|
| EP | 0402135 A2 | 12/1990 |
| EP | 0256064 B1 | 2/1993 |
| EP | 1085756 A2 | 3/2001 |
| EP | 1085756 A2 * | 3/2001 |
| WO | 9834182 A2 | 8/1998 |
| WO | WO0150737 | 7/2001 |

OTHER PUBLICATIONS

G Marmaropoulos et al., "Visualization and Playback of Television at a Sub-Show Level", Serial No. 01/023,800, filed Jul. 27, 2001.

\* cited by examiner

*Primary Examiner*—Thai Q. Tran
*Assistant Examiner*—Nigar Chowdhury

(57) ABSTRACT

A method and system for providing the creation of a visual summary of a video source during fast forward/rewind of the video can be created by using extracting frames either automatically or manually to create an initial visual summary. A series of weights may be assigned to the extracted frames, which are then filtered according to the relative weights to create a modified visual summary. The keyframe display rate is then adjusted according tot he fast forward/rewind speed, which can be either a standard speed or user selected speed, so as to display the keyframes while the video source is being fast forwarded/rewound. The keyframes may be substituted by selected images and audio, so that an advertiser can substitute an image of the product and a brief audio summary while the user is fast forwarding/rewinding past the commercial message.

22 Claims, 3 Drawing Sheets

VISUAL SUMMARY FOR SCANNING FORWARDS AND BACKWARDS IN VIDEO CONTENT

BACKGROUND OF THE INVENTION

1. Field of the Invention

The present invention relates to the use of keyframes in videos to summarize content. More particularly, the present invention relates to enhancement of keyframe content.

2. Description of the Related Art

The increase in the digital encoded videos (such as DVD's) and the continued popularity of video tapes, both pre-recorded and user-made, have created several issues never contemplated with the broadcasting of programs.

Of concern to advertisers is the ability of viewers to by-pass advertisements on videos (both in digital and analog form). Early on, it became evident that when home users would record programs, sporting events, etc. they would fast forward through the commercials. In addition, many pre-recorded videos also can sometimes have five minutes or more of advertisements prior to presenting the desired program, event, etc. Purchasers and renters of videos often fast-forward or skip to the start of the desired program, and view the advertisements as a nuisance.

Of concern to home users is the vast increase in their video libraries of movies, interviews, television shows, concerts, sporting events, etc. User made recordings can result in a plethora of unrelated often unrelated items on a video. These unrelated items are sometimes the result of impulse recording where the user jumps up and put the closest available item in the recorder so as to "catch" all of what is being viewed. As many home-users opt to sacrifice some degree of quality to obtain, for example, up to six hours of recording time from a standard two hour VHS tape, the ability to find the desired portion of the tape is cumbersome.

Just as significant a problem to home users is the desire to view a select portion of program, show, sporting event, whether that item is pre-recorded on a videotape, DVD or user recorded medium. This problem will only increase as the storage capacity of video discs increases so that more and more data can be stored on a single disk.

In the prior art, representative frames of a scene, which are referred to as keyframes, have been used to create a visual summary, a visual index and/or a visual table of contents which may or may not also include audio and text. U.S. Pat. No. 6,137,544 to Dimitrova et al. discloses a system in which scene detection and frame filtering are used for a visual indexing system to reduce the duplication of keyframes that can be caused by, for example, changes in room lighting during a particular scene merely because a character turned on or off a lamp, or a photographer's flashbulb illuminates the subject momentarily.

In addition, there are now devices and systems, such as personal TV recorders and agent technologies, which operate (normally at the meta-data level) by using Electronic Programming Guides (EPGs) and storing user preferences. These devices have the ability to store hundreds of hours of video content, so as to facilitate the process of viewing the preferred programs. Thus, there is a need to improve the keyframes of the prior art.

SUMMARY OF THE INVENTION

According to an aspect of the present invention, a method for the automatic creation of a visual summary of video content includes automatic keyframe extraction, adjusting the keyframe display rate to a user-specified fast forward/rewind speed, filtering out keyframes representing less than a predetermined threshold of time in a video, and selecting a particular keyframe of equal weight from among a plurality of equally weighted keyframes from a scene of the video. In addition, the method may include replacing individual keyframes by short sets of frames that capture movement. The selection of forwarding speed is optional and the method may be used with standard fast forward/rewind times used in conventional play devices.

The method for the automatic creation of a visual summary of video content of a video source, may comprise the steps of:

(a) automatic extraction of a plurality of keyframes representing scenes from a video source according to predetermined criteria to produce an initial visual summary;

(b) assigning weights to a particular group of keyframes extracted in step (a) representing a particular scene of the video source in the initial visual summary;

(c) refining the initial visual summary into a modified visual summary by filtering the keyframes having a lower weight assigned in step (b) relative to higher-weighted keyframes from the particular group of keyframes from the particular scene of the video source; and (d) adjusting a keyframe display rate of the modified visual summary to correspond with a fast forward/rewind speed of the video source.

The method according may also include that the assignment of weights in step (b) includes assigning the weights based on a relative time each of the keyframes in the particular group represents of the particular scene from the video source.

The method may also include that the filtering of the keyframes represent less than a predetermined threshold of time in the particular scene of the video source.

The adjusting of the keyframe display rate in step (d) may include providing audio for the modified visual summary during fast forward/rewind.

The adjusting of the keyframe display may include replacing individual keyframes by short sets of frames that capture movement in the particular scene.

In addition, the weighting of the keyframes may be based on user-specified interests. The user-specified interests may include images of specific actors in the video source. In addition, the user-specified interests include movement of actors in the video source.

According to another aspect of the present invention, a method for creation of a visual summary of video content includes user-created content information for the keyframes to control the visual summary of the video at high speed. For example, the content creators may specify which keyframes are used to create the visual summary from the total set of frames. There can be several variations on this theme, including tailoring the content to specific fast forward/rewind speeds. This feature could be used by producers of television commercials so that viewers will still receive a clear message of the product even when fast-forwarding to skip an advertisement. Moreover, audio may be broadcast on one of the separate audio tracks found in television broadcasts.

A method for creation of a visual summary of video content of a video source may also comprise the steps of:

(a) designating a plurality of frames from a video source as keyframes;

(b) adjusting a display rate of the keyframes designated in step (a) according to a fast forward/playback speed of the video source so that the keyframes are displayed for a predetermined time.

The method according may further include (c) providing an audio portion for the keyframes designated in step (a). The audio portion can be a substitute audio portion customized to correspond to the designated keyframes.

In addition, step (c) of the method can include providing a plurality of audio portions, wherein a particular audio portion is selected to match the display rate of the keyframes in step (b).

The designated keyframes in step (a) comprise an advertisement. The substitute audio portion may comprise one of: (1) a description of the product advertised in the portion of the designated keyframes comprising the advertisement, and (2) a pronunciation of the name of the product advertised in the portion of the designated keyframes comprising an advertisement.

In addition, the method according can include that step (a) comprises providing at least one user-created alternative keyframe to the visual summary that did not originate from the video source. The one user-created alternative keyframe may comprise an advertisement.

DETAILED DESCRIPTION OF THE PREFERRED EMBODIMENTS

Figure 1:
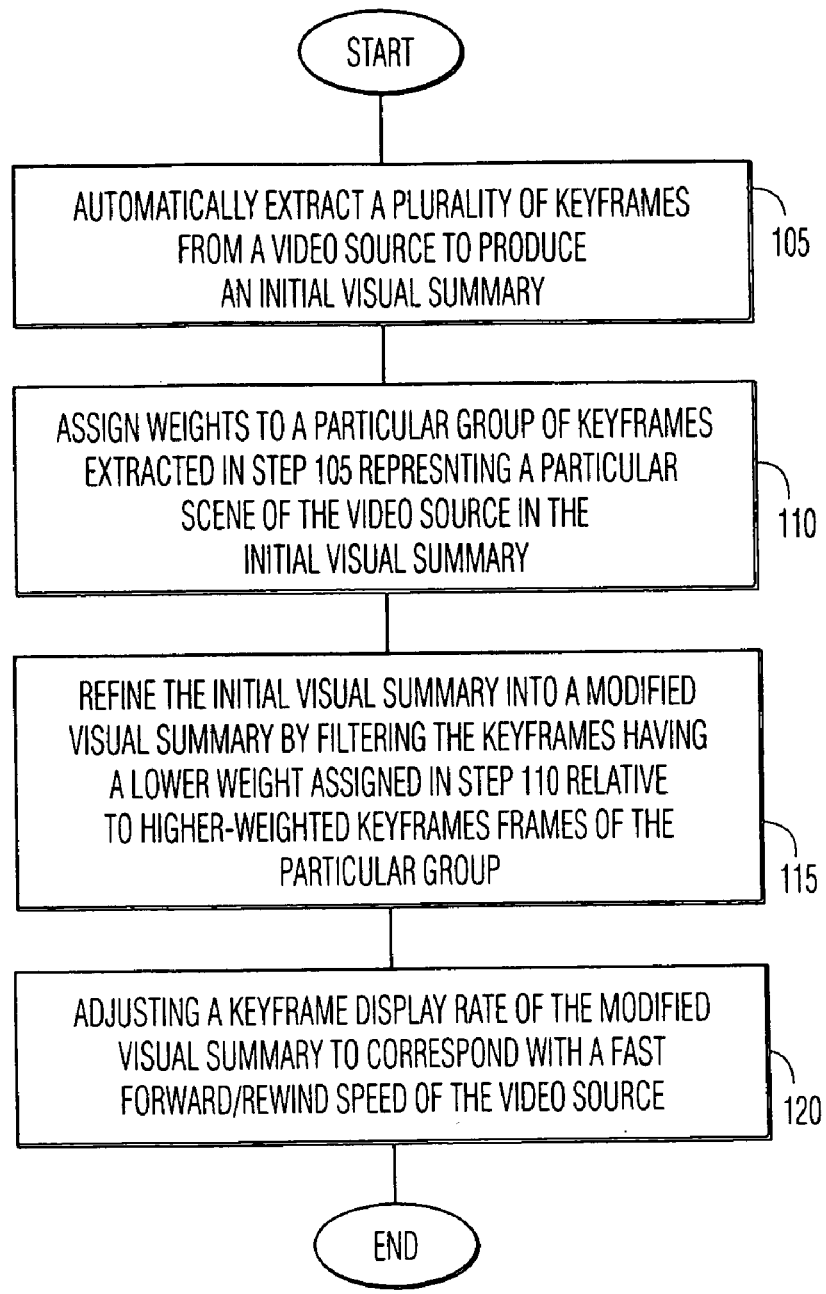
FIG. 1 is a flowchart illustrating an aspect of the present invention using automatic extraction of keyframes.

Figure provides a flowchart illustrating a first aspect of the present invention.

At step 105, there is an automatic extraction of a plurality of keyframes from a vide source to produce an initial visual summary.

The automatic extraction can be made by any conventional method of video extraction, such as block comparison, differences in luminance, chrominance, and the creation of macroblocks of the two using a popular broadcast standard, sich as CCIR-601.

In addition, Applicants hereby incorporate by reference U.S. Pat. No. 6,137,544 to Dimitrova et al. as background material indicating one way that a visual indexing system can be created, for example, by selecting keyframes of video base on calculations using DCT (discrete cosine transform) coefficients and comparisons to various thresholds to be used in scene detection methods. In addition, Applicants also hereby incorporate by reference U.S. patent application Ser. No. 01/023,800 filed by George Marmmaropoulos and John Zimmerman, based on U.S. provisional application 60/221, 404 filed Jul. 28, 2000, entitled "Visualization And Playback of Television Shows at a Sub-Show Level" that discloses segment representation and how it can relate to the content of the show.

A frame grabber would perform a frame grabbing technique in an uncompressed video segment, such as the technique used by the Intel® Smart Video Recorder III. Alternatively, in a compressed segment, such as Motion JPEG and/or MPEG I, II, or III, the signal would be broken into frames using a frame parser.

Moreover, scene detection can be performed by a multi-processor, computer, enhanced VCR, record/playback device, or television. The index could be stored in a memory such as a disk, file, tape, DVD or other storage medium, or written back on to a tape, in the case of a videotape source, or a tape of a broadcast.

At step 110, weights are assigned to at least a particular group of keyframes representing a particular scene of the video source in the initial visual summary. For example, a keyframe representing a scene from a movie where actor John Wayne is speaking might be assigned a certain predetermined weight. However, a subsequent keyframe from the same scene where John Wayne gets into a gun a battle, or kisses the leading lady, can be assigned a higher weight than the first keyframe because the subsequent keyframe is better representative of the scene than the first keyframe. It is entirely possible that multiple keyframes will be used to represent a particular scene in a video, so a relative weighting system that has attached values to user likes/dislikes, or is preprogrammed according to studies on what a majority of people would prefer to use as a keyframe to identify a particular scene from a video would be factors in the weighting system. The images of selected actors could also be used for the keyframes.

At step 115, the initial visual summary may be refined by filtering the keyframes that have the lowest weights relative to the higher weighted keyframes. While the example of weighting in this aspect is in terms of a particular scene of the video, it is also possible to weight all the keyframes according to user preferences. It is possible that the system can, for example, use the time span as a basis for identifying (and weighting) keyframes representing relative short period of the video sequence with a different or lower weighting than keyframes representing longer periods of the video sequence.

However, it should be understood by person of ordinary skill in the art that sometimes a critical part of a program, such as the firing of a gun, could take a relatively short time, but nonetheless, could be an important part of a visual summary/index.

At step 120, there is an adjustment of the keyframe display rate of the modified visual summary to correspond with a fast forward/rewind of the video source. This could be base, for example, on the standard speed that a typical videotape is rewound while the picture is displayed on the monitor, or it could take into account variable forward/rewind speeds that could be controlled by the user.

It should be understood that audio could be provided to accompany the keyframes, and it is possible that the audio could be part of the soundtrack of program, or could be an annunciation of the portion of the program (e.g. opening monologue, featured guest, epilogue, closing credits, etc.) represented by the keyframe. In the case of a commercial, the name of the sponsor, such as "Philips"® could be dubbed in so the user would hear the name as the video source is being fast forwarded/rewound.

In addition, the keyframes could alternatively be replaced by short sets of frames that capture movement in the particular scene. For example, if the video source is a sporting event, a baseball player hitting a baseball (or missing, for that matter) could be representative of the lengthy at bat of a particular player that ended in the batter getting a hit, (or striking out). Similarly, images of someone running into the end-zone to score a touchdown, either from the video itself, or system generated, could be used to replace keyframes representing the scoring of the winning touchdown of a football game.

Figure 2:
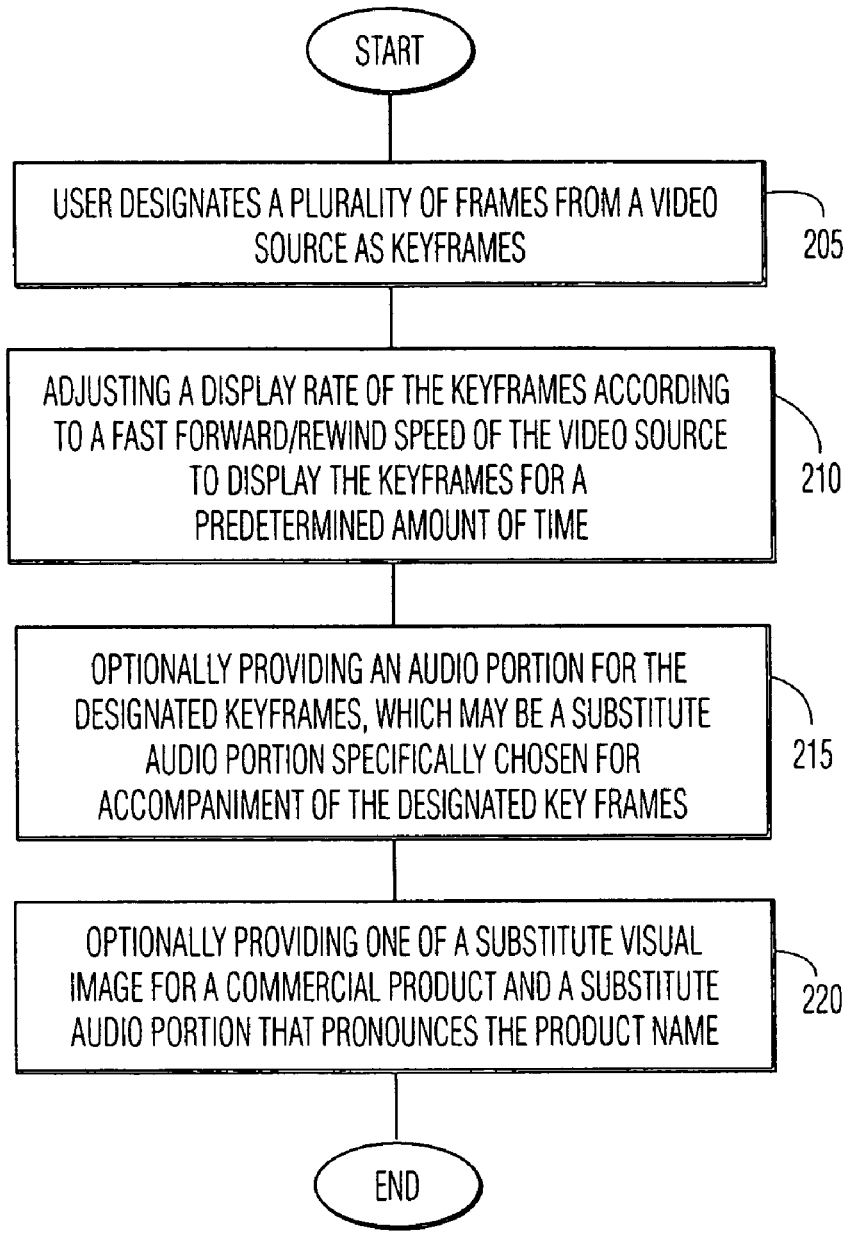
FIG. 2 is a flowchart illustrating an aspect of the present invention where the user designates the keyframes.

FIG. 2 illustrates another aspect of a method according to the present invention. In this example, in lieu of automatic extraction of keyframes, the user would select the keyframes. This selection could be done after the broadcast has been recorded, while it is being recorded, or during playback of a video source, such as a videotape, DVD, etc.

At step 205, the user designates a plurality of frames from a video source as keyframes. The user could be making this designation, for example, as a program is being recorded, or during a subsequent viewing. The designation could be made by a home user while recording, or later editing, home footage. Alternatively, this designation could be made by a commercial editor of a videotape, DVD, or other type of video, made for sale, rental, or download. In a commercial setting, there could be advertisements or other types of commercial messages that companies pay for with an expectation that they will be viewed by the audience.

In addition, this designation could also comprise just a portion of the keyframes, for example, by an advertiser whose product will appear on an ad during a program. The user could be identifying frames by their number, for example, choosing frames 8, 16 and 87 to represent the visual summary of a first portion of a program.

Alternatively, the user could merely click a button or pointer to select specific frames. Considering that the number of frames per second of video is large, a typical sequence selected by a user would constitute a number of successive frames just in the time period of clicking a mouse or pointer, unless the pointing only extracts the frame displayed at the exact moment the pointer was activated. Alternatively, the user could slow down the viewing speed while making the selections from the normal speed to a fraction thereof.

At step 210, the display rate of the keyframes are selected by the user to be displayed in the visual summary for a predetermined amount of time when viewing a visual index. However, when a user is in the process of forwarding/rewinding the video source, the length of display, or the content of display, could be changed according to the forward/rewind speed.

At step 215, there is optionally provided the step of providing a substitute audio portion, for example, when a long winded commercial is now going to be passed over in a few seconds. For example, just the recording of the product or service might be announced in lieu of the entire commercial. Alternatively, a short slogan could replace the audio.

At step 220, there is the optional step of providing a substitute visual image (such as a still frame of a soda bottle, if the advertised item is a soft drink), or the logo of a vehicle, if the advertised item is an automobile.

Figure 3:
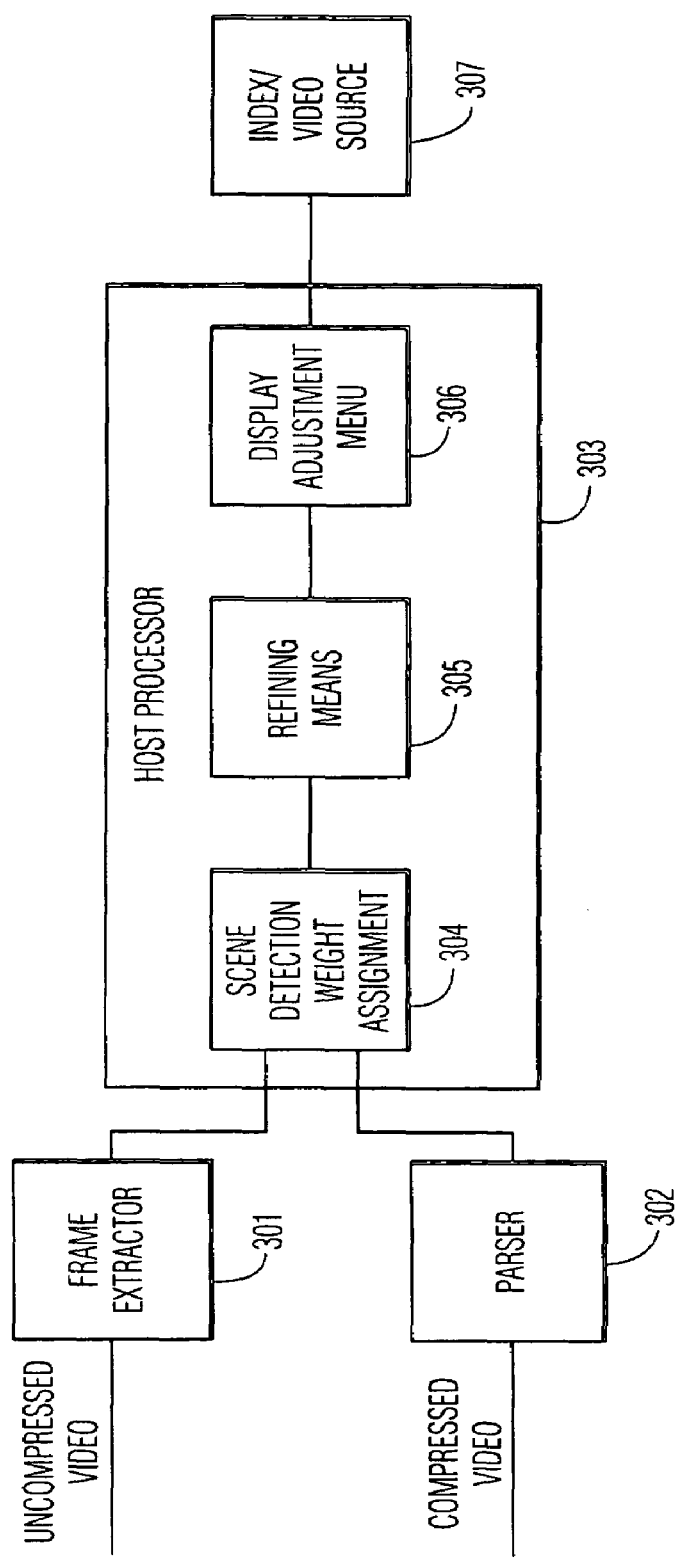
FIG. 3 illustrates an example of a system according to the present invention for producing a visual summary for scanning forwards and backwards.

FIG. 3 shows one embodiment of a system used for the creation of a visual summary while scanning forwards and backwards according to the present invention.

Typically, either one of a frame grabber 301 or a frame parser 302 would initially be used for providing frames to the host processor 303, depending on whether or not the video source is uncompressed or compressed, respectively. The host processor could be a video editor, computer, component of a video record/play device, etc., which includes a means for detecting weight assignment 304, typically a scene detector, a refining means 305, typically for filtering out redundant/low weighted frames received from the means for detecting weight assignment. A display rate adjusting means 306 adjusts the output of the visual summary according to a fast forward/rewind speed that is then stored on a video source 307 for viewing during fast forward/rewind of the video source. One way this could be done is to record the visual summary on a track displayed during fast forward/rewind of the video source. There are other ways that the skilled artisan can display the visual summary while fast forwarding/rewinding the video source.

Various modifications may be made to the present invention by a person of ordinary skill in the art that would not depart from the spirit of the invention and the scope of the appended claims. For example, the type of frame extraction, the weighting of the frames, the type of filtering, and the adjustment of the display rate could all be modified in their function, but such modifications would not depart from the claimed invention.

What is claimed is:

1. A method for the automatic creation of a visual summary of video content of a video source, comprising the steps of:
   (a) automatic extraction of a plurality of keyframes representing scenes from a video source according to predetermined criteria to produce an initial visual summary;
   (b) assigning weights to a particular group of keyframes extracted in step (a) representing a particular scene of the video source in the initial visual summary;
   (c) refining the initial visual summary into a modified visual summary by filtering the keyframes having a lower weight assigned in step (b) relative to higher-weighted keyframes from the particular group of keyframes from the particular scene of the video source; and
   (d) adjusting a keyframe display rate of the modified visual summary to correspond with a fast forward/rewind speed of the video source so that the keyframes can be displayed during fast forward/rewind of the video source.

2. The method according to claim 1, wherein assignment of weights in step (b) includes assigning the weights based on a relative time each of the keyframes in the particular group represents of the particular scene from the video source.

3. The method according to claim 2, wherein the keyframes in the particular group that represent less than a predetermined threshold of time in the particular scene of the video source are filtered.

4. The method according to claim 1, wherein the keyframe display rate is adjusted to correspond with a user-selected fast forward/rewind speed of the video source.

5. The method according to claim 1, wherein the adjusting of the keyframe display rate in step (d) includes providing audio for the modified visual summary during fast forward/rewind.

6. The method according to claim 1, wherein the adjusting of the keyframe display includes replacing individual keyframes by short sets of frames that capture movement in the particular scene.

7. The method according to claim 1, wherein the weighting of the keyframes is based on user-specified interests.

8. The method according to claim 7, wherein the user-specified interests include images of specific actors in the video source.

9. The method according to claim 7, wherein the user-specified interests include movement of actors in the video source.

10. A method for creation of a visual summary of video content of a video source comprising the steps of:

(a) designating a plurality of frames from a video source as keyframes;

(b) adjusting a display rate of the keyframes designated in step (a) according to a fast forward/rewind speed of the video source so that the keyframes are displayed for a predetermined time during fast forward/rewind of the video source.

11. The method according to claim 10, further including (c) providing an audio portion for the keyframes designated in step (a).

12. The method according to claim 11, where the audio portion is a substitute audio portion customized to correspond to the designated keyframes.

13. The method according to claim 11, wherein step (c) includes providing a plurality of audio portions, wherein a particular audio portion is selected to match the display rate of the keyframes in step (b).

14. The method according to claim 10, where a portion of the designated keyframes in step (a) comprise an advertisement.

15. The method according to claim 14, wherein the substitute audio portion comprises one of: (1) a description of the product advertised in the portion of the designated keyframes comprising the advertisement, and (2) a pronunciation of the name of the product advertised in the portion of the designated keyframes comprising an advertisement.

16. The method according to claim 10, wherein step (a) includes providing at least one user-created alternative keyframe to the visual summary that did not originate from the video source.

17. The method according to claim 16, wherein said at least one user-created alternative keyframe comprises an advertisement.

18. A system for the automatic creation of a visual summary of video content of a video source, comprising:

means for extraction of a plurality of keyframes representing scenes from a video source according to predetermined criteria to produce an initial visual summary;

means for assigning weights to a particular group of keyframes extracted by the means for extraction representing a particular scene of the video source in the initial visual summary;

means for refining the initial visual summary into a modified visual summary by filtering the keyframes having a lower weight relative to higher-weighted keyframes from the particular group of keyframes from the particular scene of the video source; and means for adjusting a keyframe display rate of the modified visual summary to correspond with a fast forward/rewind speed of the video source so that the keyframes are displayed during fast forward/rewind.

19. The system according to claim 18, wherein the means for extraction comprises manual designation of keyframes representative of the video source.

20. The system according to claim 18, wherein the means for extraction comprises automatic extraction means.

21. The system according to claim 18, wherein the means for assigning assigns the weights to the particular group of keyframes according to a relative time span represented by each respective keyframe.

22. The system according to claim 21, wherein the means for adjusting the keyframe display rate adjusts the display rate according to a user-selected fast forward/rewind speed of the video source.

* * * * *